United States Patent
Jenkins

(10) Patent No.: US 7,062,124 B2
(45) Date of Patent: *Jun. 13, 2006

(54) OPTICAL FILTER

(75) Inventor: Richard Michael Jenkins, Malvern (GB)

(73) Assignee: Qinetiq Limited (GB)

( * ) Notice: Subject to any disclaimer, the term of this patent is extended or adjusted under 35 U.S.C. 154(b) by 97 days.

This patent is subject to a terminal disclaimer.

(21) Appl. No.: 10/492,803

(22) PCT Filed: Oct. 8, 2002

(86) PCT No.: PCT/GB02/04564

§ 371 (c)(1),
(2), (4) Date: Apr. 15, 2004

(87) PCT Pub. No.: WO03/036351

PCT Pub. Date: May 1, 2003

(65) Prior Publication Data

US 2004/0252934 A1    Dec. 16, 2004

(30) Foreign Application Priority Data

Oct. 20, 2001  (GB) ................. 0125262.6

(51) Int. Cl.
*G02B 6/26* (2006.01)
(52) U.S. Cl. ...................................... 385/28
(58) Field of Classification Search ............ 385/28
See application file for complete search history.

(56) References Cited

U.S. PATENT DOCUMENTS

| | | | |
|---|---|---|---|
| 4,693,544 A | | 9/1987 | Yamasaki et al. |
| 5,410,625 A | | 4/1995 | Jenkins et al. |
| 5,640,474 A | | 6/1997 | Tayag |
| 5,689,597 A | * | 11/1997 | Besse .......................... 385/39 |
| 5,862,288 A | | 1/1999 | Batchman et al. |
| 6,792,172 B1 | * | 9/2004 | Levy et al. ................... 385/15 |
| 2004/0247235 A1 | * | 12/2004 | Jenkins ........................ 385/15 |

FOREIGN PATENT DOCUMENTS

JP  58-068713  4/1983

OTHER PUBLICATIONS

Paiam et al, Compact Planar 980/1550-nm Wavelength Multi/Demultiplexer Based on Multimode Interference, Oct. 1995, IEEE PHotonics Technology Letters, vol. 7, No. 10, pp. 1180-1182.*

* cited by examiner

*Primary Examiner*—Juliana Kang
(74) *Attorney, Agent, or Firm*—McDonnell Hoehnen Hulbert & Berghoff LLP

(57) ABSTRACT

An optical filter (100) comprises a multimode waveguide (126) and first (122) and second (124) coupling waveguides which communicate with lateral sides of the multimode waveguide. The filter operates by reproducing an optical field distribution input to the multimode waveguide via one of the coupling waveguides at the position in the multimode waveguide where the other coupling waveguide communicates with the multimode waveguide. This occurs for radiation of a wavelength to be filtered but not for radiation of other wavelengths.

6 Claims, 4 Drawing Sheets

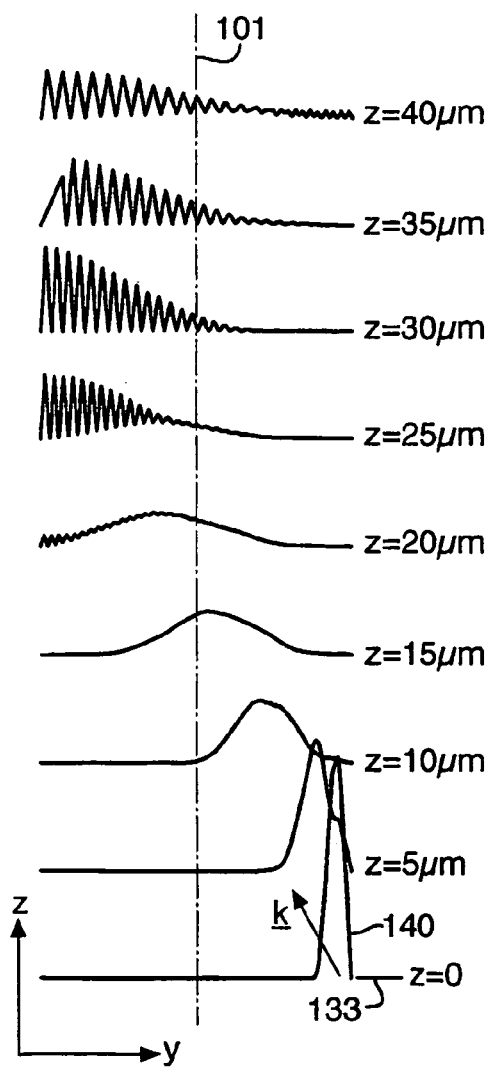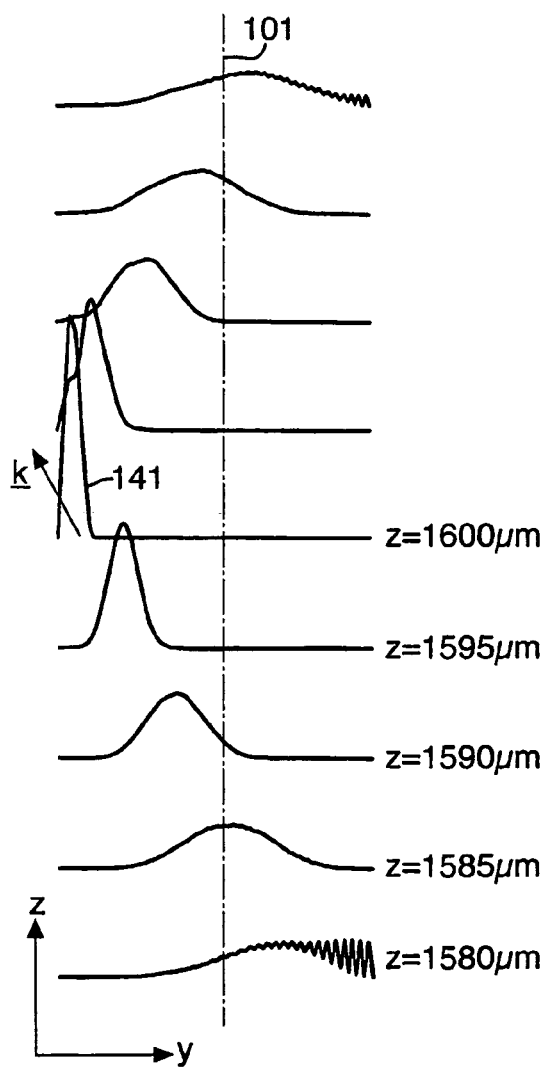

OPTICAL FILTER

The present invention relates to optical filters.

In the field of optics, wavelength filtering, i.e. extraction of an optical signal of a specific wavelength from a signal comprising a number of spectral components, is an important function. For example, in the field of optical communication, wavelength filtering allows a particular optical communication channel to be extracted from a plurality of wavelength-multiplexed channels, allowing that channel to processed further; for example it might be amplified, routed, or demodulated. In the field of optical communication, components for performing filtering and other operations are required to be integrated with other optical devices into integrated optical systems in which light is guided within fibre-optic or semiconductor waveguides. Devices currently used to perform filtering within such integrated optical systems include Bragg gratings, Fabry-Perot and Mach-Zehnder interferometers, array waveguide gratings (AWGs) and acousto-optic filters. Such devices are complex and therefore require a substantial amount of processing during their fabrication, as a result of which integrated optical systems incorporating them are expensive and time-consuming to produce. These devices are described, for example, in the book "Optical Networks—A Practical Perspective" by R. Ramaswami and K. N. Sivarajan (Morgan Kaufmann Publishers 1998, ISBN1-55860-445-6).

Optical filters based on the effect of self-imaging in a multimode waveguide are also known in the prior art: for example U.S. Pat. No. 5,862,288 discloses (in FIG. 1 thereof) a filter based on the principle of 1-to-1 imaging of an input optical field distribution over a distance $L=w^2/m\lambda_0$ within a multimode waveguide, where w is the width of the multimode waveguide and $m\lambda_0$ is the wavelength of guided plane wave radiation, which wavelength is passed by the filter in preference to radiation of other wavelengths. m is a positive integer. Such filters are easily fabricated and integrated with other optical and optoelectronic devices.

It is an object of the invention to provide an alternative optical filter based on the effect of self-imaging in a multimode waveguide.

According to a first aspect of the invention, this object is achieved by an optical filter comprising (i) a multimode waveguide; and
(ii) first second coupling waveguides which communicate with the multimode waveguide at first and second longitudinal positions therealong respectively;

wherein the first and second longitudinal positions and the relative orientations of the waveguides' central longitudinal axes are such that an input optical field distribution, being a lowest order transverse mode of the coupling waveguides, introduced into the multimode waveguide at the first longitudinal position is substantially reproduced, by virtue of modal dispersion and inter-modal interference within the multimode waveguide, at the second longitudinal position for optical radiation of a wavelength to be passed by the device in preference to radiation of other wavelengths, and coupled into the second coupling waveguide, the respective intensities of the optical field distributions at the first and second longitudinal positions being substantially equal, characterised in that the coupling waveguides each communicate with a lateral side of the multimode waveguide.

The first and second longitudinal positions may be located on opposite lateral sides of the multimode waveguide in which case the first and second longitudinal positions may be separated by a distance $4\ mw^2/\lambda$, where w is the width of the multimode waveguide, m is a positive integer and $\lambda$ is the wavelength of radiation, within the multimode waveguide's core layer, to be passed by the filter in preference to radiation of other wavelengths. Increased separation of the first and second positions results in the filter's transmission function comprising transmission peaks with a reduced full width at half maximum.

Alternatively, the first and second longitudinal positions may be located on a common lateral side of the multimode waveguide in which case the first and second longitudinal positions may be separated by a distance $8\ mw^2/\lambda$ where w is the width of the multimode waveguide and m is a positive integer. Increased separation of the first and second positions results in the filter's transmission function comprising transmission peaks with a reduced full width at half maximum.

According to a second aspect of the invention, there is provided a laser oscillator characterised by a filter according to the first aspect of the invention. Such a laser has an output with spectral characteristics determined by the filter comprised within it.

Embodiments of the invention are described below, by way of example only, with reference to the accompanying drawings in which:

FIGS. 4 and 5 illustrate the spatial distribution of an optical field as a function of distance within a portions of the FIG. 1 filter;

Figure 1:
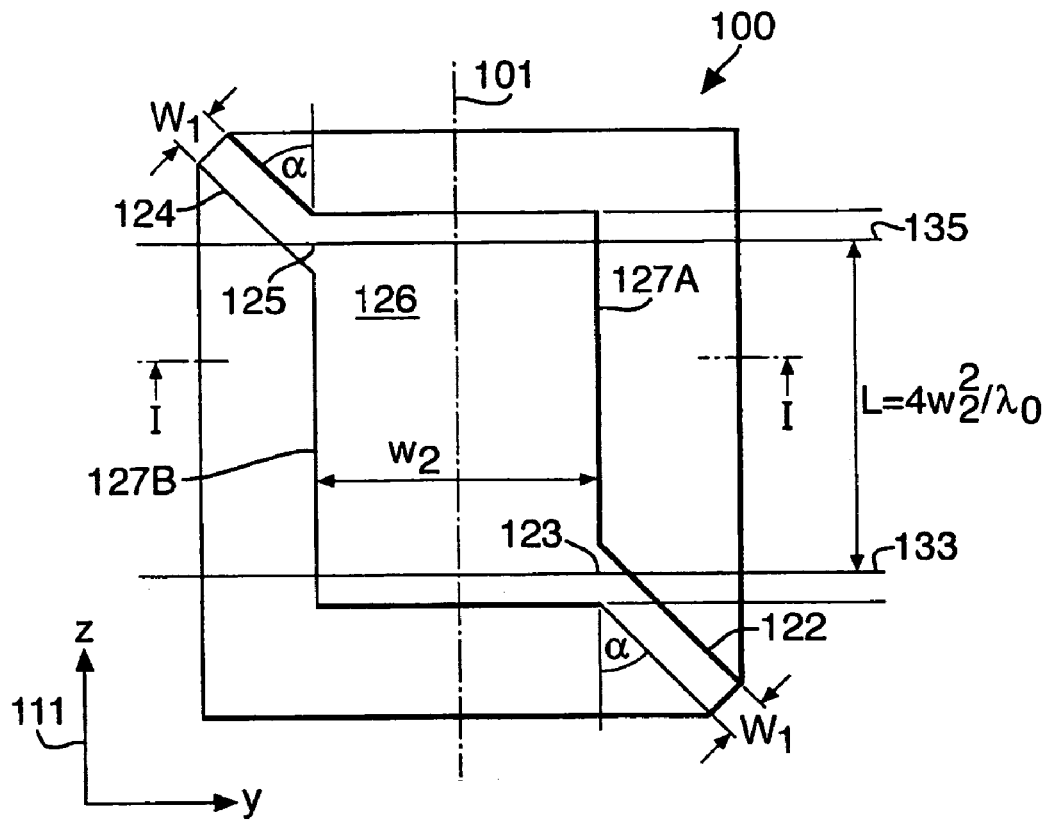
FIG. 1 shows a plan view of an optical filter of the invention.

Referring to FIG. 1, there is shown a plan view of a wavelength filter of the invention indicated generally by 100. The filter 100 is referred to a coordinate system 111 and passes input radiation having a wavelength $m\lambda_0$ within the filter (where $\lambda_0=1$ μm and m is an integer) in preference to input radiation of other wavelengths. Radiation having a wavelength $m\lambda_0$ within the filter has substantially the same wavelength in the multimode waveguide's core material. The filter 100 comprises a multimode waveguide 126 of width $w_2=20$ μm, and input 122 and output 124 single-mode waveguides of width $w_1=2$ μm. The input 122 and output 124 waveguides communicate with the multimode waveguide 126 at points 123, 125 on lateral sides 127A, 127B respectively of the multimode waveguide 126, and are inclined at an angle $\alpha=42.9°$ to the central longitudinal axis 101 of the multimode waveguide 126. Points 123, 125 are separated in the z-direction by a distance $L=4w_2^2/\lambda_0=1600$ μm and lie in xy planes 133, 135 respectively. The length of the multimode waveguide 126 is equal to $4w_2^2/\lambda_0+w_1/\sin 42.9°=66.9$ μm.

Figure 2:
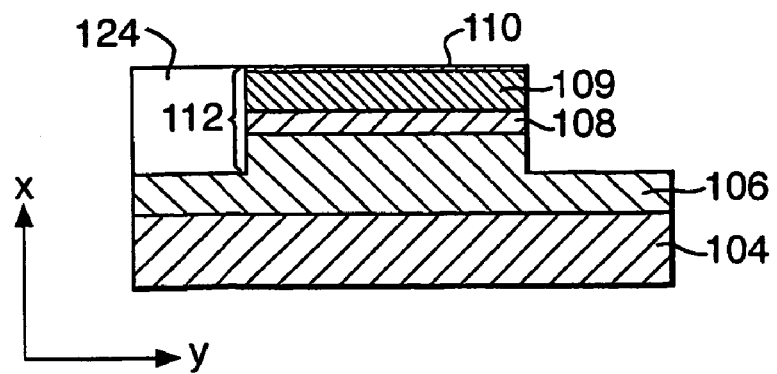
FIG. 2 shows a cross-section through the FIG. 1 filter along the line I—I in FIG. 1.

Referring to FIG. 2, there is shown a vertical section through the filter 100 along an xy plane I—I indicated in FIG. 1. In the x-direction the filter 100 is a single-mode slab waveguide having a GaAs core layer 108 1 μm thick and $Al_{0.1}Ga_{0.9}As$ cladding layers 109, 106 having thicknesses of 2 μm and 4 μm respectively. The waveguides 122, 124, 126 are formed by etching through the core layer 108 and into the cladding layer 106 to a depth of 2 μm to produce ridge structures such as 112. The filter 100 is formed on a substrate 104 and has a GaAs capping layer 110.

The filter 100 operates as follows. Input radiation comprising spectral components having wavelengths $m\lambda_0$ within the filter 100 is introduced into the input waveguide 122. Each spectral component in the input radiation excites a plurality of transverse modes of the form $EH_{1,j}$ within the multimode waveguide 126, where j may take both odd and even integer values; i.e. both symmetric and antisymmetric transverse modes of the waveguide 126 are excited. The intensity distribution of radiation entering the multimode waveguide 126 via the input waveguide 126 is substantially reproduced at the point 125 (i.e. at the output waveguide 124) only for spectral components $m\lambda_0$ of the input radiation.

Figure 3:
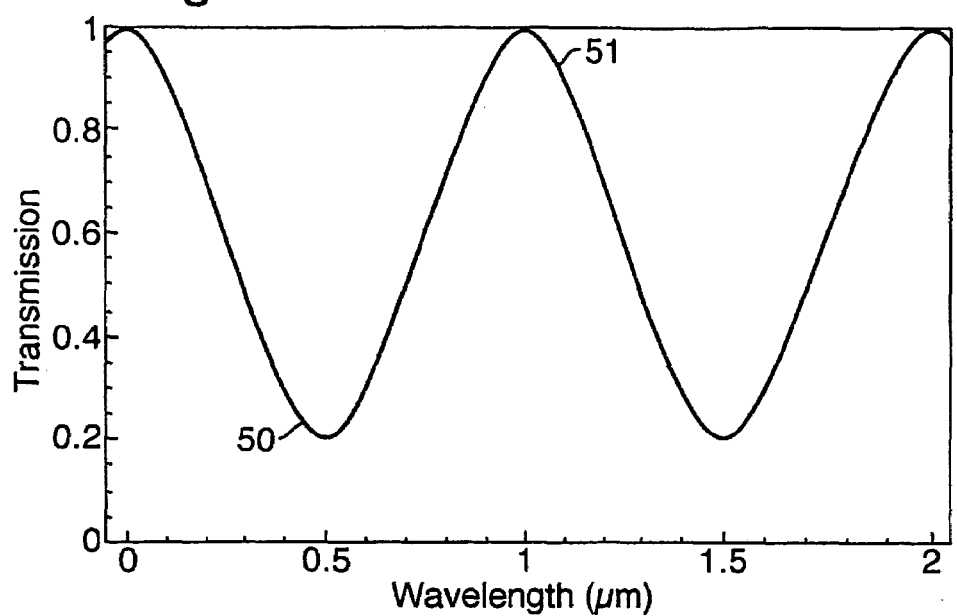
FIG. 3 shows transmission of the FIG. 1 filter as a function of wavelength.

Transmission of the filter 100 as a function of wavelength is shown as a transmission curve 50 in FIG. 3. The curve 50 comprises a series of transmission peaks such as 51 which have a full width at half maximum (FWHM) of approximately 560 nm.

Referring to FIG. 4, the intensity distribution, within the multimode waveguide 126, in the y-direction of the spectral component $\lambda_0$ is shown at intervals of 5 μm in the z-direction, from z=0 to z=40 μm measured from the xy plane 133 at which the input waveguide 122 meets the multimode waveguide 126. At the xy plane 133, the intensity distribution 140 in the y-direction of the spectral component $\lambda_0$ within the multimode waveguide is substantially an $EH_{1,1}$ transverse mode distribution of the input waveguide 122, located at the side 127A of the multimode waveguide 126; i.e. the intensity distribution 140 comprises a single peak at the side 127A of the multimode waveguide 126 and is substantially zero for other values of y. Input radiation introduced into the multimode waveguide 126 from the input waveguide 124 has a wavevector indicated by k in FIG. 4. k is in the yz plane and makes an angle $\alpha=42.9°$ with the central longitudinal axis 101 of the multimode waveguide 126. As a result of modal dispersion and intermodal interference within the multimode waveguide 126, the intensity distribution in the y-direction varies with z as shown in FIG. 4.

FIG. 5 illustrates the intensity distribution in the y-direction within the multimode waveguide 126 of the spectral component $\lambda$ at intervals of 5 μm in the z-direction, from z=1580 μm to z=1600 μm, at which z-position the output waveguide 124 is located. At z=1600 μm, the intensity distribution 141 in the y-direction is a mirror image about the axis 101 of the distribution 140 and the associated radiation has a wavevector $\underline{k}$; hence the spectral component $\lambda$ is efficiently coupled into the output waveguide 124. For a spectral components $\lambda \neq m\lambda$ a mirror image of the intensity distribution of that spectral component at the xy plane 133 about the axis 101 is generated in a z-distance not equal to 1600 μm: for a spectral component $\lambda > \lambda (\neq m\lambda_0)$ such generation occurs over a distance $4w_2^2/\lambda < 4w_2^2/\lambda_0$, and for a spectral component $\lambda < \lambda_0 (\neq m\lambda_0)$ such generation occurs over a distance $4w_2^2/\lambda > 4w_2^2/\lambda_0$. Thus spectral components other than $m\lambda_0$ are coupled less efficiently into the output waveguide 124.

The input 122 and output 124 waveguides of the filter 100 may be multimode waveguides instead of single-mode waveguides. If this is the case, input radiation must be introduced into the input waveguide 122 such that only the lowest order transverse mode of the input 122 and output 124 waveguides is excited.

Figure 6:
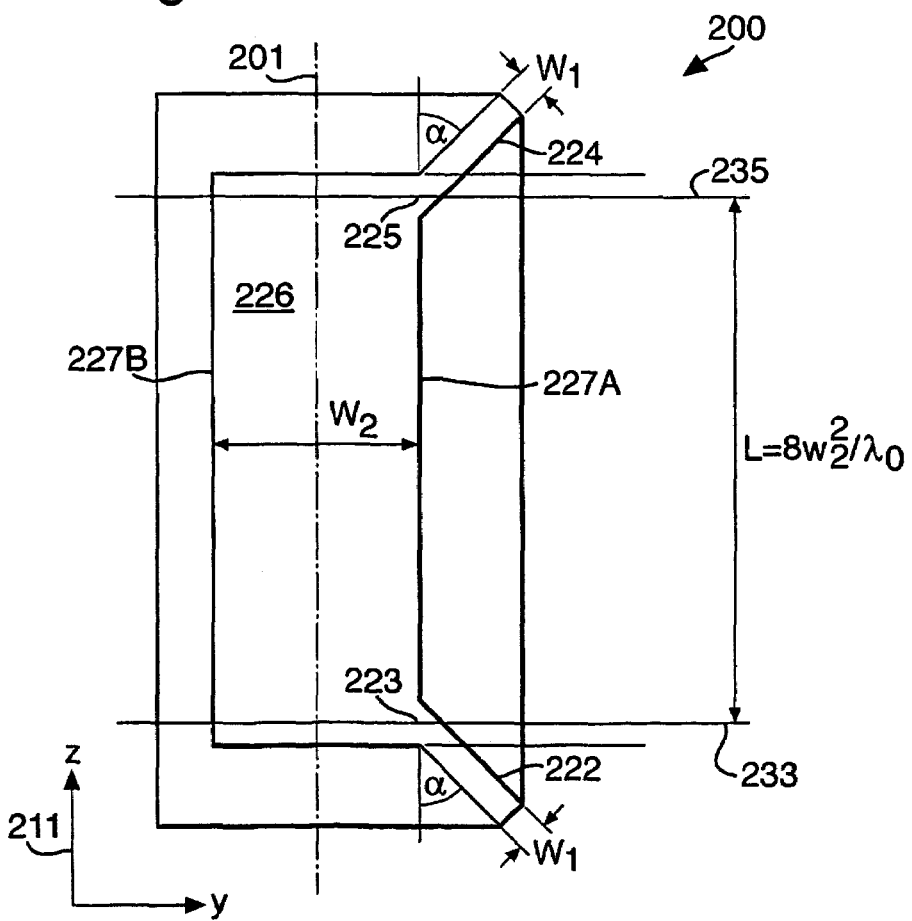
FIG. 6 shows a plan view of an alternative optical filter of the invention.

Referring to FIG. 6, there is shown a plan view of a further wavelength fitter of the invention indicated generally by 200. The filter 200 is referred to a coordinate system 211 and passes spectral components of input radiation having a wavelength $m\lambda_0/2$ within the filter 200 (where $\lambda_0=1$ μm and m is an integer) in preference to spectral components of other wavelengths in the input radiation. The filter 200 comprises a multimode waveguide 226 of width $w_2=20$ μm, and input 222 and output 224 single-mode waveguides of width $w_1=2$ μm. The input 222 and output 224 waveguides communicate with the multimode waveguide 226 at points 223, 225 respectively on a lateral side 227A of the multimode waveguide 226, and are inclined at an angle $\alpha=42.9°$ to the central longitudinal axis 201 of the multimode waveguide 226. Points 223, 225 are separated in the z-direction by a distance $L=8w_2^2/\lambda_0=3200$ μm and lie in xy planes 233, 235 respectively. The length of the multimode waveguide 226 is equal to $8w_2^2/\lambda_0 + w_1/\sin 42.9° = 3202.9$ μm.

The filter 200 operates in a similar manner to operation of the filter 100. The filter 200 has a transmission function like to that shown in FIG. 3 except that wavelengths $m\lambda_0/2$ are passed by the device 200 in preference to other wavelengths, where m is an integer. In addition, the FWHM of transmission peaks of the transmission function of the filter 200 is less than that of the filter 100.

Figure 7:
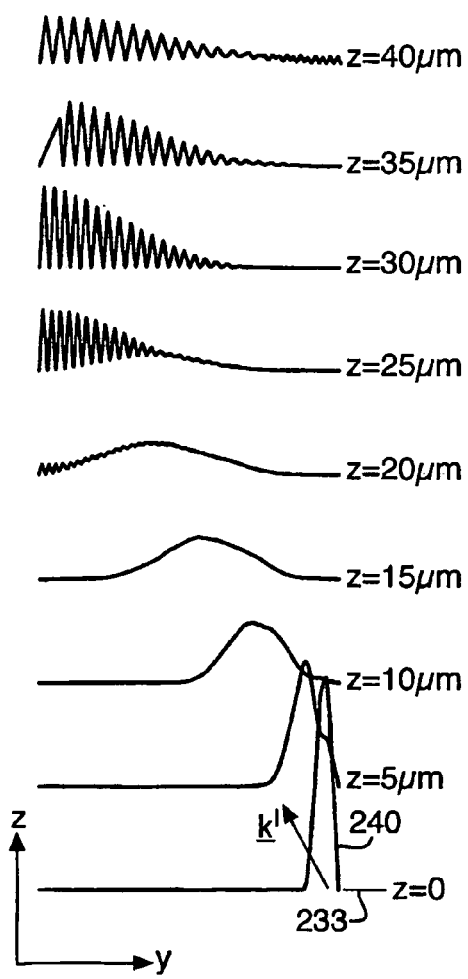
FIGS. 7 and 8 illustrate the spatial distribution of an optical field as a function of distance within a portions of the FIG. 6 filter.

Referring to FIG. 7, the intensity distribution, within the multimode waveguide 326, in the y-direction of the spectral component $\lambda_0$ is shown at intervals of 5 μm in the z-direction, from z=0 to z=40 μm measured from the xy plane 233 at which the input waveguide 222 meets the multimode waveguide 226. At the xy plane 233, the intensity distribution 240 in the y-direction of the spectral component $\lambda_0$ within the multimode waveguide is substantially an $EH_{1,1}$ transverse mode distribution of the input waveguide 222 located at the side 227A of the multimode waveguide 226; i.e. the intensity distribution 240 comprises a single peak at the side 227A of the multimode waveguide 226 and is substantially zero for other values of y. Input radiation introduced into the multimode waveguide 226 from the input waveguide 224 has a wavevector indicated by k' in FIG. 12. k' is in the yz plane and makes an angle $\alpha=42.9°$ with the central longitudinal axis 101 of the multimode waveguide 226. As a result of modal dispersion and intermodal interference within the multimode waveguide 226, the intensity distribution in the y-direction varies with z as shown in FIG. 7.

Figure 8:
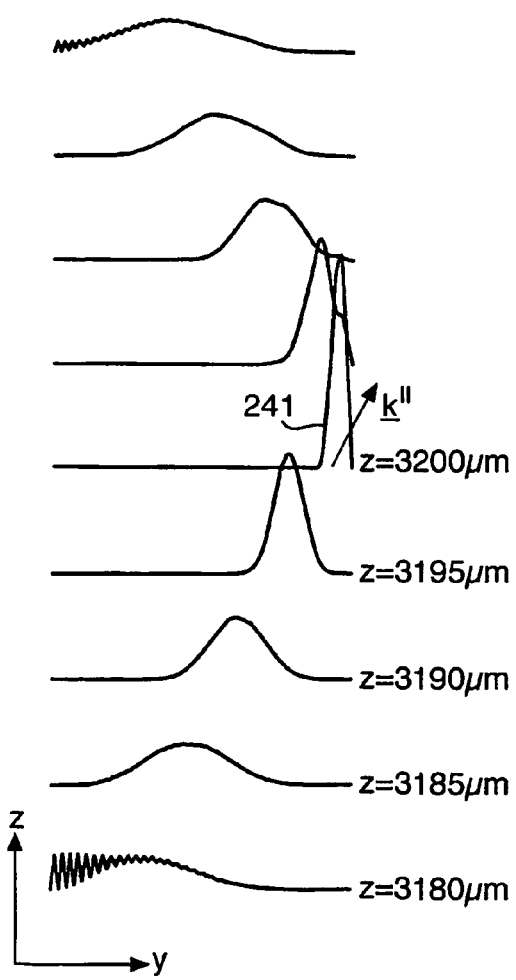

FIG. 8 illustrates the intensity distribution in the y-direction within the multimode waveguide 226 of the spectral component $\lambda_0$ at intervals of 5 μm in the z-direction, from z=3180 μm to z=3200 μm, at which z-position the output waveguide 224 is located. At z=3200 μm, the intensity distribution 141 in the y-direction is substantially replicated and radiation in the multimode waveguide 226 at this z-position has a wavevector k" ($k_y"=-k'_y$ and $|k"|=|k'|$) so that the spectral component $\lambda_0$ is efficiently coupled into the output waveguide 224. For a spectral component other than $m\lambda_0/2$, replication occurs at a z-distance different to 3200 μm: for a spectral component $\lambda > \lambda_0 (\neq m\lambda_0/2)$ such replication occurs over a distance $8w_2^2/\lambda < 8w_2^2/\lambda_0$, and for a spectral component $\lambda < \lambda_0 (\neq m\lambda_0/2)$ such replication occurs over a distance $8w_2^2/\lambda > 8w_2^2/\lambda_0$. Thus spectral components other than $m\lambda_0/2$ are coupled less efficiently into the output waveguide 224.

The input 222 and output 224 waveguides of the filter 200 may be multimode waveguides instead of single-mode waveguides. If this is the case, input radiation must be introduced into the input waveguide 222 such that only the lowest order transverse mode of that waveguide is excited.

The angle α may take values other than 42.9°, however it must be sufficiently small to allow total internal reflection of light within the multimode waveguides 126, 226. For the filters 100, 200, the angle α must be less than 73.3°. The angle α must also be sufficiently large to avoid phase perturbation effects of modes within the multimode waveguides 126, 226.

Optical filters of the invention may be modified to produce to produce laser oscillators. For example the device 100 may be modified to provide optical gain within any or all of the waveguides 122, 124, 126, and optical feedback means (e.g. mirrors formed by cleaving) at ends of the waveguides 122, 124 remote from the multimode waveguide 126. The spectral characteristics of such a laser oscillator are determined by the filter comprised therein.

The invention claimed is:

1. An optical filter comprising
   (i) a multimode waveguide; and
   (ii) first and second coupling waveguides which communicate with the multimode waveguide at first and second longitudinal positions therealong respectively;
   wherein the first and second longitudinal positions and the relative orientations of the waveguides' central longitudinal axes are such that an input optical field distribution (140; 240), being a lowest order transverse mode of the coupling waveguides, introduced into the multimode waveguide at the first longitudinal position is substantially reproduced, by virtue of modal dispersion and inter-modal interference within the multimode waveguide, at the second longitudinal position for optical radiation of a wavelength to be passed by the device in preference to radiation of other wavelengths, and coupled into the second coupling waveguide, the respective intensities of the optical field distributions at the first and second longitudinal positions being substantially equal, characterised in that the coupling waveguides each communicate with the multimode waveguide at a lateral side thereof and in that the central longitudinal axis of each coupling waveguide is inclined to that of the multimode waveguide at the point that coupling waveguide communicates with the multimode waveguide.

2. An optical filter according to claim 1 wherein the first and second longitudinal positions are located on opposite lateral sides of the multimode waveguide.

3. An optical filter according to claim 2 wherein the first and second longitudinal positions are separated by a distance $4mw^2/\lambda$, where w is the width of the multimode waveguide, m is a positive integer and λ is the wavelength of radiation, within the multimode waveguide's core layer, to be passed by the filter in preference to radiation of other wavelengths.

4. An optical filter according to claim 1 wherein the first and second longitudinal positions are located on a common lateral side of the multimode waveguide.

5. An optical filter according to claim 4 wherein the first and second longitudinal positions are separated by a distance $8mw^2/\lambda$ where w is the width of the multimode waveguide, m is a positive integer and λ is the wavelength of radiation, within the multimode waveguide's core layer to be passed by the filter in preference to radiation of other wavelengths.

6. A laser oscillator characterised by a filter according to claim 1.

* * * * *